(12) United States Patent
Gould et al.

(10) Patent No.: US 11,718,263 B2
(45) Date of Patent: Aug. 8, 2023

(54) FILL TUBE ADAPTOR FOR INFLATOR

(71) Applicant: ZF Passive Safety Systems US Inc., Washington, MI (US)

(72) Inventors: Douglas Gould, Lake Orion, MI (US); Gabriela Diaz, Royal Oak, MI (US); David Varcoe, Bruce Township, MI (US); Jason Bare, Macomb, MI (US)

(73) Assignee: ZF PASSIVE SAFETY SYSTEMS US INC., Washington, MI (US)

(\*) Notice: Subject to any disclaimer, the term of this patent is extended or adjusted under 35 U.S.C. 154(b) by 0 days.

(21) Appl. No.: 17/464,718

(22) Filed: Sep. 2, 2021

(65) Prior Publication Data

US 2023/0060876 A1    Mar. 2, 2023

(51) Int. Cl.
*B60R 21/217* (2011.01)
*B60R 21/213* (2011.01)
*B60R 21/264* (2006.01)

(52) U.S. Cl.
CPC .......... *B60R 21/217* (2013.01); *B60R 21/213* (2013.01); *B60R 21/264* (2013.01)

(58) Field of Classification Search
CPC .................................................. B60R 21/217
See application file for complete search history.

(56) References Cited

U.S. PATENT DOCUMENTS

| | | | | |
|---|---|---|---|---|
| 5,611,563 A | * | 3/1997 | Olson | B60R 21/2171 280/741 |
| 5,803,486 A | * | 9/1998 | Spencer | B60R 21/261 280/730.2 |
| 7,938,436 B2 | * | 5/2011 | Lunt | B60R 21/2171 280/740 |
| 8,628,114 B1 | * | 1/2014 | Quioc | B60R 21/2338 297/480 |
| 9,914,424 B2 | * | 3/2018 | Tonooka | B60R 21/261 |
| 9,963,099 B2 | * | 5/2018 | Jayasuriya | B62D 1/11 |
| 10,124,759 B2 | * | 11/2018 | Smith | C06D 5/02 |
| 10,293,775 B2 | * | 5/2019 | Wang | B60R 21/231 |
| 10,780,858 B2 | * | 9/2020 | Shigemura | B60R 21/2171 |
| 2004/0113400 A1 | * | 6/2004 | Weber | B60R 21/26 280/736 |
| 2004/0188991 A1 | * | 9/2004 | Schneider | B60R 21/2338 280/743.2 |
| 2007/0063489 A1 | * | 3/2007 | Dinsdale | B60R 21/261 280/728.2 |

(Continued)

FOREIGN PATENT DOCUMENTS

| | | | | | |
|---|---|---|---|---|---|
| GB | 2586494 A | * | 2/2021 | ......... | B60R 21/214 |
| JP | 2011121469 A | * | 6/2011 | ......... | B60R 21/207 |

(Continued)

*Primary Examiner* — Nicole T Verley
(74) *Attorney, Agent, or Firm* — Tarolli, Sundheim, Covell & Tummino L.L.P.

(57) ABSTRACT

An adaptor for connecting a fill tube to an inflator includes a sleeve configured to fit over a discharge end portion of the inflator and to be connected to the inflator. The adaptor also includes an end portion comprising a nipple configured to receive and connect with the fill tube, wherein the sleeve is configured to direct inflation fluid discharged from the inflator toward the nipple, and the nipple is configured to direct the inflation fluid into the fill tube.

17 Claims, 8 Drawing Sheets

(56) References Cited

U.S. PATENT DOCUMENTS

| | | | |
|---|---|---|---|
| 2007/0284858 A1* | 12/2007 | Nishimura | B60R 21/217 |
| | | | 280/729 |
| 2017/0203847 A1* | 7/2017 | Browning | B64D 11/0619 |
| 2019/0054888 A1* | 2/2019 | Fu | B60R 21/206 |
| 2019/0135220 A1* | 5/2019 | Rupp | B60R 21/2155 |
| 2020/0026088 A1* | 1/2020 | Tzvieli | G02B 27/0172 |

FOREIGN PATENT DOCUMENTS

| | | | | |
|---|---|---|---|---|
| KR | 20220046940 A * | 4/2022 | | |
| WO | WO-0041919 A1 * | 7/2000 | | B60R 21/16 |
| WO | WO-2007035691 A2 * | 3/2007 | | B60R 21/26 |
| WO | WO-2011070969 A1 * | 6/2011 | | B60R 21/207 |
| WO | WO-2015169440 A2 * | 11/2015 | | B60R 21/214 |
| WO | WO-2022122801 A1 * | 6/2022 | | |

\* cited by examiner

FILL TUBE ADAPTOR FOR INFLATOR

TECHNICAL FIELD

The invention relates to a vehicle safety system including an airbag module including an airbag, an inflator for providing inflation fluid for inflating the airbag, and a fill tube for delivering inflation fluid from the inflator to the airbag. The airbag module also includes an adaptor for facilitating a connection of the fill tube to the inflator so that the inflator can be located remotely of the airbag.

BACKGROUND OF THE INVENTION

It is known to provide an inflator for inflating an inflatable vehicle occupant protection device, such as an airbag. Inflators can be several types, such as solid propellant, stored gas, or hybrid. Solid propellant inflators include a volume of a solid propellant, typically in the form of tablets, that are pyrotechnic in nature and generate inflation fluid when ignited in response to inflator actuation. Stored gas inflators store a pressurized volume of inflation fluid that is released in response to inflator actuation. Hybrid inflators combine these technologies, including both pressurized inflation fluid and a volume of solid propellant gas generating material.

Inflators for passenger frontal airbags (PABs) and curtain airbags (CABs) can be generally cylindrical and elongated, including a tubular housing that helps define a gas chamber in which the stored gas and/or solid propellant is stored. An igniter assembly includes an igniter end cap supported (e.g., welded) at one end of the end of the housing. The igniter assembly includes an igniter, supported by the igniter end cap, and a rupturable membrane, such as a burst disk, that is connected to the igniter end cap and isolates the igniter from the gas chamber. The igniter assembly closes the gas chamber at one end of the housing.

The inflator includes an outlet assembly includes at end of the housing opposite the igniter assembly. The outlet assembly includes an outlet or nozzle through which inflation fluid is discharged when the inflator is actuated. The outlet assembly also includes a rupturable membrane, such as a burst disk, that is connected to the outlet end cap and seals the outlet/nozzle. The outlet assembly closes the gas chamber at the end of the housing opposite the igniter assembly.

The outlet assembly further includes an end cap that is fitted over the outlet/nozzle and secured (e.g., welded) to the inflator housing. The end cap forms a diffuser that includes a plurality of openings configured to disperse and diffuse inflation fluid discharged from the inflator through the outlet/nozzle. The diffuser openings can be configured to direct inflation fluid in a plurality of directions, e.g., radially, axially, or at any angle or angles therebetween. For safety reasons, the diffuser openings are configured to be thrust neutral prior to installation in the vehicle. By "thrust neutral," it is meant that the diffuser openings are configured so that so that accidental actuation and discharge of inflation fluid does not propel the inflator, causing it to become a projectile.

Upon actuation of the inflator, reaction products from the igniter rupture the igniter assembly burst disk. In a stored gas inflator configuration, the igniter is configured to create a shock wave that propagates through the stored gas in the chamber and ruptures the outlet assembly burst disk, which releases the inflation fluid to discharge through the outlet/nozzle and diffuser into the protection device. In a solid propellant or hybrid inflator configuration, reaction products from the igniter enter the chamber and ignite solid propellant, causing a reaction that produces reaction products (e.g., heat and inflation fluid). The diffuser assembly burst disk ruptures in response to the increased heat and pressure in the chamber resulting from the reaction of the solid propellant. The inflation fluid is discharged from the inflator through the diffuser and into the protection device.

Passenger frontal airbag (PAB) inflators are typically configured to be positioned inside the airbag so that the inflation fluid is discharged directly into the bag. Curtain airbag (CAB) inflators can be configured to be positioned inside the bag, or to connect to a mouth portion of the airbag, which is typically in the form of a tubular sleeve. This connection is typically facilitated by the outlet assembly. PAB inflators differ from CAB inflators in that the volume of inflation fluid produced by a PAB inflator must be far greater than that of a CAB inflator because the PAB is substantially larger in volume than the CAB. Accordingly, PAB inflators can be substantially larger, both physically and in terms of the volume of inflation fluid generated, than CAB inflators.

SUMMARY OF THE INVENTION

A vehicle safety system includes an airbag module that implements an apparatus configured to adapt an inflator for remote connection to an airbag. According to one implementation, a passenger frontal airbag (PAB), which is typically deployed from an instrument panel in front of a passenger side front row seated occupant, is instead deployed from the vehicle roof. Space along the front edge of the vehicle roof where the PAB is deployed can be limited, for example, due to the limited thickness of the roof structure and also due to the presence of a sunroof, where an opening through the roof is formed. Because of this limited space, and due at least partially to the fact that the PAB is a large volume airbag that requires a correspondingly large volume of inflation fluid, it can be necessary to locate the inflator at a location that is remote from the airbag, such as along a lateral edge, i.e., a roof rail, of the vehicle and to connect this remotely located inflator to the PAB via a fill tube.

To reduce manufacturing complexity, it might be desirable to use the same PAB inflator implemented in an instrument panel-mounted PAB module for the remotely located inflator of the roof-mounted PAB module. Because, however, instrument panel-mounted PAB modules typically install the inflator inside the airbag, whereas a roof-mounted PAB module installs the inflator remotely from the airbag with a fill tube connection, there exists a need for adaptation so that the same inflator can be used in either instance. Accordingly, the airbag modules disclosed herein provide various methods and structures for adapting conventional PAB inflator for remote PAB inflation via a fill tube.

According to one aspect, an adaptor for connecting a fill tube to an inflator includes a sleeve configured to fit over a discharge end portion of the inflator and to be connected to the inflator. The adaptor also includes an end portion comprising a nipple configured to receive and connect with the fill tube, wherein the sleeve is configured to direct inflation fluid discharged from the inflator toward the nipple, and the nipple is configured to direct the inflation fluid into the fill tube.

According to another aspect, the sleeve can be configured to receive an inflator stud to connect the adaptor to the inflator.

According to another aspect, the sleeve can include a slot configured to receive the inflator stud to connect the adaptor to the inflator.

According to another aspect, the slot can have a generally L-shaped configuration. The adaptor can be configured to slide axially over the discharge end of the inflator so that the inflator stud enters and slides along a first leg of the slot until it engages an edge of the slot. The adaptor can also be configured to be twisted relative to the inflator so that the inflator stud enters and slides along a second leg of the slot.

According to another aspect, the second leg of the slot can be configured so that an interference is formed when the inflator stud enters the second leg of the stud. The interference can retain the adaptor on the inflator.

According to another aspect, the interference can be formed between opposite edges of the second leg of the slot and the inflator stud.

According to another aspect, the interference can be formed by the engagement between the inflator stud and one edge of the second leg of the slot, and by the engagement of the discharge end of the inflator and the end portion of the adaptor.

According to another aspect, the nipple can be configured to connect with the fill tube through one of a compression fitting, a union fitting, and a crimped fitting.

According to another aspect, the adaptor can include a throat that extends between the sleeve and the nipple. The throat can include a plurality of thrust-neutral openings configured to discharge inflation radially in opposing directions. The nipple can be configured to receive a closed end nut that blocks inflation fluid flow through the nipple so that inflation fluid discharged from the inflator is directed radially through the thrust-neutral openings. The nipple can also be configured to receive an open end nut comprising an opening that permits the fill tube to pass through the nipple and through the throat thus blocking the thrust-neutral openings, the open end nut in combination with the nipple forming a fitting that connects the fill tube to the adaptor.

According to another aspect, the adaptor can include a pair of adaptor halves that are connectable with each other to form the sleeve.

According to another aspect, each adaptor half can include one or more flanges configured overlie each other and to receive a fastener to connect the adaptor halves to each other and to secure the adaptor to the discharge end of the inflator.

According to another aspect, one of the adaptor halves comprises an opening configured to receive the inflator stud.

According to another aspect, the adaptor can be configured to adapt an inflator configured to discharge inflation fluid radially into an airbag for axial inflation fluid discharge into the fill tube.

According to another aspect, an airbag module can include an airbag, an inflator for producing inflation fluid for inflating the airbag, a fill tube for delivering inflation fluid from the inflator to the airbag, and the adaptor according to any of the preceding aspects.

According to another aspect, the airbag module can be configured to be installed in a vehicle roof. The airbag can be configured to deploy downward to an inflated and deployed position. The inflator can be configured to be installed remotely from the airbag, and the fill tube can be configured to extend from the inflator to the airbag.

According to another aspect, the airbag can include a frontal airbag configured to deploy between a vehicle occupant and an instrument panel of the vehicle. The airbag can be configured to be installed in a roof header, and the inflator can be configured to be installed in a roof rail.

According to another aspect, the inflator can be a passenger airbag inflator configured to be positioned inside a passenger airbag that deploys from the instrument panel. The adaptor can be configured to adapt the passenger airbag inflator for use with the fill tube.

According to another aspect, a vehicle safety system can include the airbag module according to the preceding aspects. The vehicle safety system can also include a controller configured to actuate the inflator in response to the occurrence of an event for which inflation and deployment of the airbag is desired.

DRAWINGS

The foregoing and other features of the invention will become apparent to those skilled in the art to which the invention relates upon reading the following description with reference to the accompanying drawings, in which.

DESCRIPTION

The invention relates to a vehicle safety system 10 for helping to protect an occupant 12 of a vehicle 14. The vehicle safety system 10 includes an airbag module 50 that includes an airbag 52 for helping to protect the occupant 12 upon the occurrence of an event, such as a collision, for which occupant protection is desired. In the example configuration of vehicle safety system 10 illustrated in FIG. 1, the airbag module 50 is a passenger frontal airbag module, and the airbag 52 is a frontal passenger airbag (PAB) that is inflatable between an instrument panel 20 of the vehicle 14 and the occupant 12 of a vehicle seat 22 on a passenger side 24 of the vehicle.

The airbag module 50 and, thus, the airbag 52 could have alternative configurations. For example, the airbag module could be a frontal driver airbag (DAB) module configured so that the DAB inflates and deploys between an occupant on a driver side 26 of the vehicle 14 and the vehicle steering wheel (not shown). As another alternative, the airbag module could be a curtain airbag (CAB) module configured so that the CAB inflates between a vehicle occupant and a side structure 28 of the vehicle, on the passenger side 24 or driver side 26 of the vehicle 14.

Figure 1:
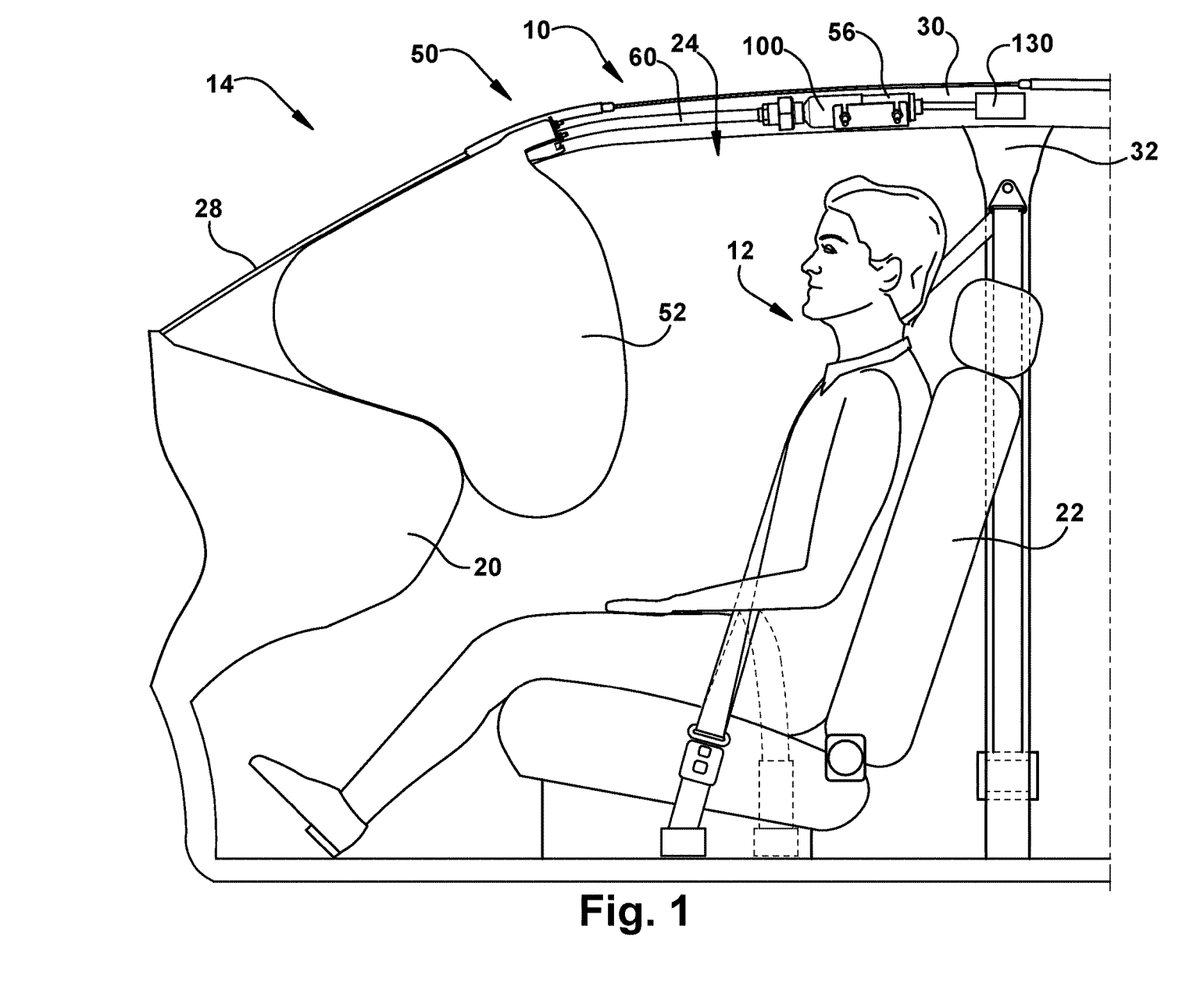
FIG. 1 is a schematic side view illustrating a vehicle safety system installed in a vehicle, according to an example configuration of the invention.

As shown in FIG. 1, the PAB 52, when inflated, occupies the space defined by the instrument panel 20, windshield 28, and roof 30 of the vehicle 14, which help define a reaction surface for supporting the PAB against the impact force of the occupant 12. Of course, the space occupied by the airbag, the surface(s) defining that space, and the reaction surfaces for the airbag will differ depending on the alternative implementations listed above. For instance, a DAB 52 implementation would include the steering wheel as helping to form the reaction surface, and a CAB implementation would include the vehicle side structure 32 (e.g., doors, pillars, etc.).

Figure 2:
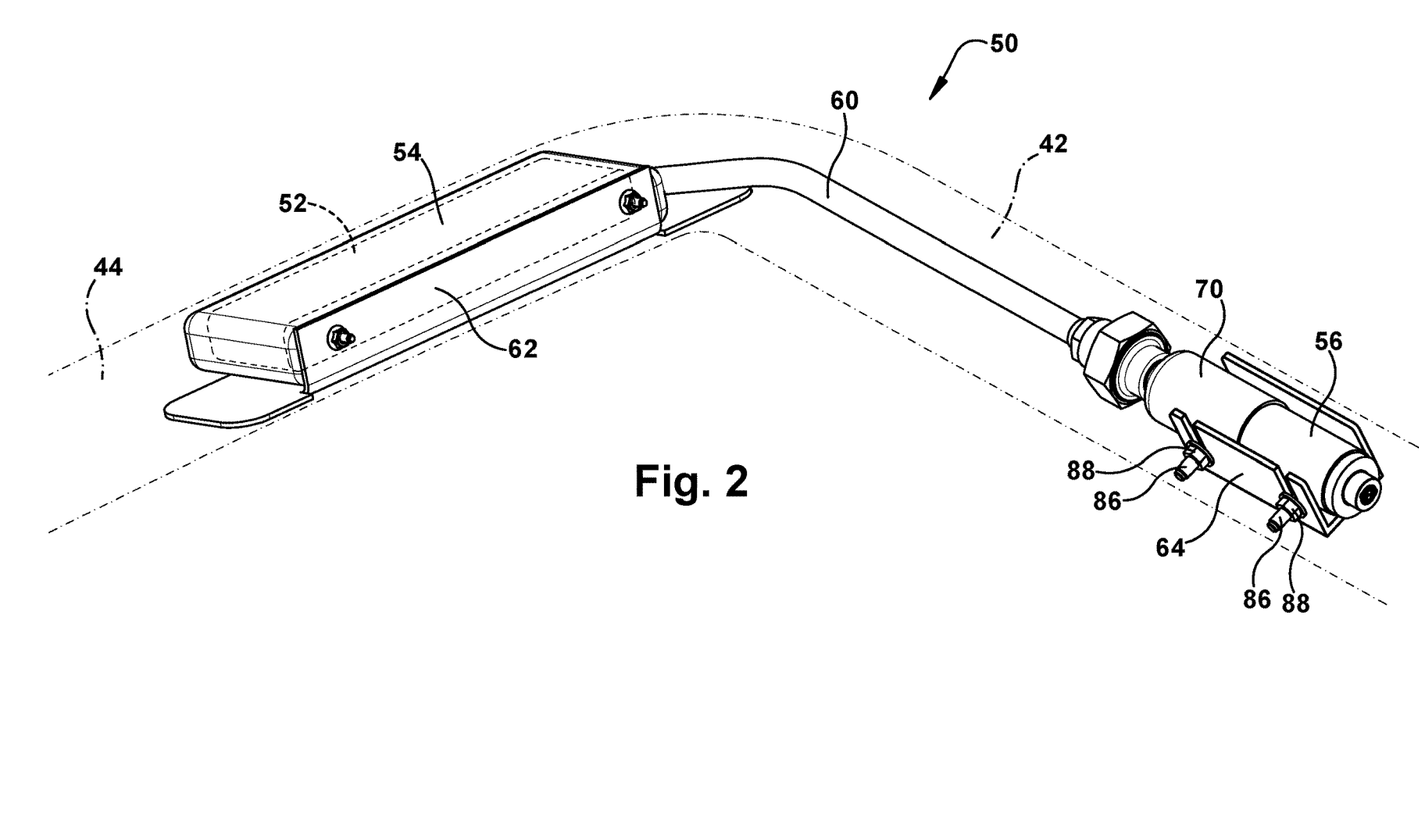
FIG. 2 is a perspective view of an airbag module that forms a portion of the vehicle safety system.

The airbag module 50 is mounted to the vehicle roof 30 and deploys downward when inflated. To facilitate this mounting arrangement, the airbag module can include hardware 62, such as a bracket, for mounting the airbag 52 to the vehicle 14, and hardware 64, such as a bracket, for mounting the inflator 56 to the vehicle (see, FIG. 2).

Figure 3:
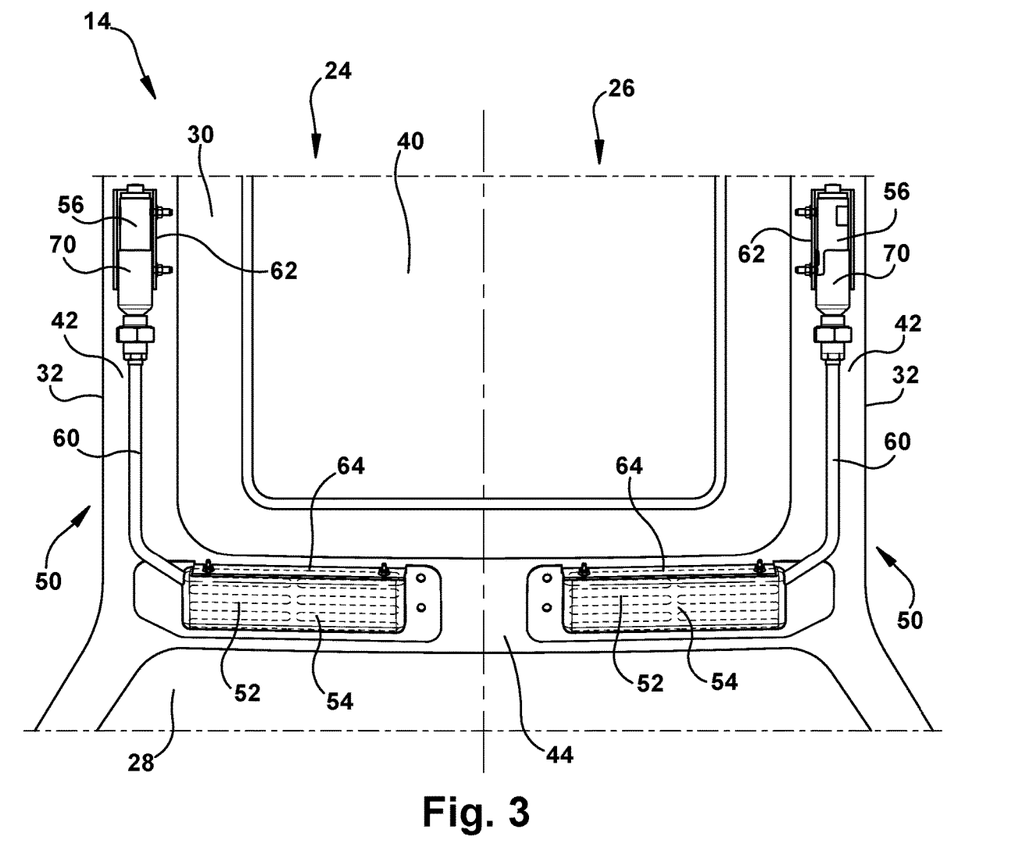
FIG. 3 is a schematic view illustrating the installation of the vehicle safety system in a roof structure of the vehicle.

Referring to FIG. 3, the vehicle safety system 10 can include two airbag modules 50—one mounted on the passenger side 24 (a PAB module) and one mounted on the driver side 26 (a DAB module). Each airbag module 50 includes its respective airbag 52 (DAB or PAB), which is packaged in a cover or housing 54. Each airbag module 50 also includes an inflator 56 and a fill tube 60 for delivering inflation fluid from the inflator to the airbag 52.

As shown in FIG. 3, the vehicle roof 30 can include a sunroof 40, which limits the space available for mounting the airbag module 50. The inclusion of the sunroof 40, especially the large, panoramic type that is becoming more and more common, essentially limits the available structure for mounting the airbag module 50 to the roof rail 42, which runs along the side structure 32 of the vehicle 14, and the roof header 44, which extends widthwise across the vehicle between the roof rails.

Additionally, the frontal airbag configurations of the PAB and DAB modules 50 include large volume airbags 52. As a result, the inflators 56 must be correspondingly configured to deliver the volume of inflation fluid necessary to inflate and deploy the airbags 52 in the requisite amount of time. To allow for this and, at the same time, account for the presence of the sunroof 40, the airbag modules 50 are configured to mount the inflators 56 on the roof rail 42 and the airbags 52 on the roof header 44, with the fill tube 60 being configured to follow the structure of the roof 30 and connect the two.

The volume of the roof-mounted PAB 52 can be the same or on par with the traditional, instrument panel mounted airbags. The roof-mounted configuration of the DAB 52 can have a volume that is much greater than traditional steering wheel-mounted DAB configurations. Because the DAB 52 is roof-mounted, its configuration is not constrained by limitations owed to a steering wheel mounting arrangement, and can therefore offer coverage that is extended well beyond the coverage of the traditional steering wheel-mounted airbags. As a result, the DAB and PAB can have volumes that are equivalent enough so that the same inflator can be utilized in both the DAB and PAB modules 50.

Additionally, because the airbags 52 have volumes that are also on par with instrument panel-mounted PABs, it can be desirable to implement in the roof-mounted PAB and DAB modules 50 the same inflator used with instrument panel-mounted PAB modules. Doing so is advantageous in terms of manufacturing because the same inflator can be used in a wider array of vehicles, i.e., those that implement an instrument panel-mounted airbag modules and those that implement the roof-mounted airbag modules 50 disclosed herein. This economy of scale can render appreciable savings in terms of costs, manufacturing efforts and complexity, materials, spare parts, etc.

To allow for this economy of scale, the inflator 56 implemented in the airbag module 50 is configured for utilization with the traditional instrument panel-mounted PAB module. The fact that the inflator 56 can be used in the traditional instrument panel-mounted PAB module configuration is not a trivial matter. Instrument panel mounted PAB modules implement an inflator-in-bag configuration in which the inflator, at least the diffuser, is positioned inside the inflatable volume of the bag. The diffuser is configured to discharge inflation fluid radially into the volume of the airbag. This configuration serves the purpose of re-directing inflation fluid from the axial direction in which it is discharged from the inflator gas chamber laterally or radially into the space between the instrument panel and the occupant.

At the same time, this configuration also meets thrust-neutral regulations, which require that the inflator be configured such that accidental discharge prior to installation does not produce thrust that would cause the inflator to become a self-propelled projectile. To Achieve this, the inflator diffuser can, for example, be configured to discharge inflation fluid radially with respect to the longitudinal inflator axis and in opposite directions.

To facilitate implementing the traditionally configured PAB inflator 56, the airbag module 50 includes an adaptor 100 that facilitates connecting the fill tube 60 to the inflator 56. The inflator 56 can be of any configuration, such as a solid propellant inflator, stored gas inflator, or hybrid inflator. Referring to FIGS. 4A-4D, the inflator 56 includes a cylindrical housing 80 that defines a gas chamber which, depending on the inflator configuration, can store propellant materials and/or stored gas. A pair of studs 86 extend from the housing 80 and facilitate connecting the inflator to the vehicle 14. The studs 86 can, for example, be threaded studs configured to receive a threaded fastener, such as a nut 88 (see FIG. 2), to establish this connection.

The inflator 56 includes a nozzle 82 at one end of the housing 80 and an igniter assembly 84 at the opposite end of the housing. The nozzle 82 includes a rupturable membrane, such as a burst disk, that blocks inflation fluid from being discharged through the nozzle. The igniter assembly 84 is configured to be connected electrically to an airbag controller 130 (see FIG. 1). The igniter assembly 84 includes an igniter (not shown) that is actuatable in response to an electrical signal from the airbag controller 130 to 1) ignite the propellant to initiate gas generation and to rupture the burst disk 90 to release inflation fluid through the nozzle 82.

The inflator 56 also includes a diffuser 92 that is connected to the housing 80, e.g., via welding, and covers the nozzle 82. The diffuser 92 includes a pair of outlet openings 94 that are generally elongated and positioned on radially opposite sides of the diffuser. The outlet openings 94 can vary in shape, size, number, and positioning. The outlet openings 94, being equally sized/shaped and positioned radially opposite each other, give the inflator 56 a thrust-neutral configuration.

The adaptor 100 includes a sleeve 102 having a generally cylindrical configuration, a tapered/domed end 104, and a nipple 106 that extends axially therefrom. The sleeve 102 is configured to fit over the inflator 56, covering the diffuser 92 and a portion of the housing 80 extending axially beyond at least one of the studs 86. The sleeve 102 is configured to form a close fit with the exterior surface of the housing.

The adaptor 100 includes a slot 110 for helping to connect the adaptor to the housing 80. The slot 110 is L-shaped, including a first leg 112 that extends axially into the open end of the sleeve 102. A second leg 114 extends transverse to the first leg 112 along the circumference of the sleeve 102. To connect the adaptor 100 to the inflator 56, the sleeve 102 is slid over the diffuser 92 and along the outside of the housing 80, as indicated generally by arrow A in FIG. 4B.

Figures 4A, 4B, 4C:
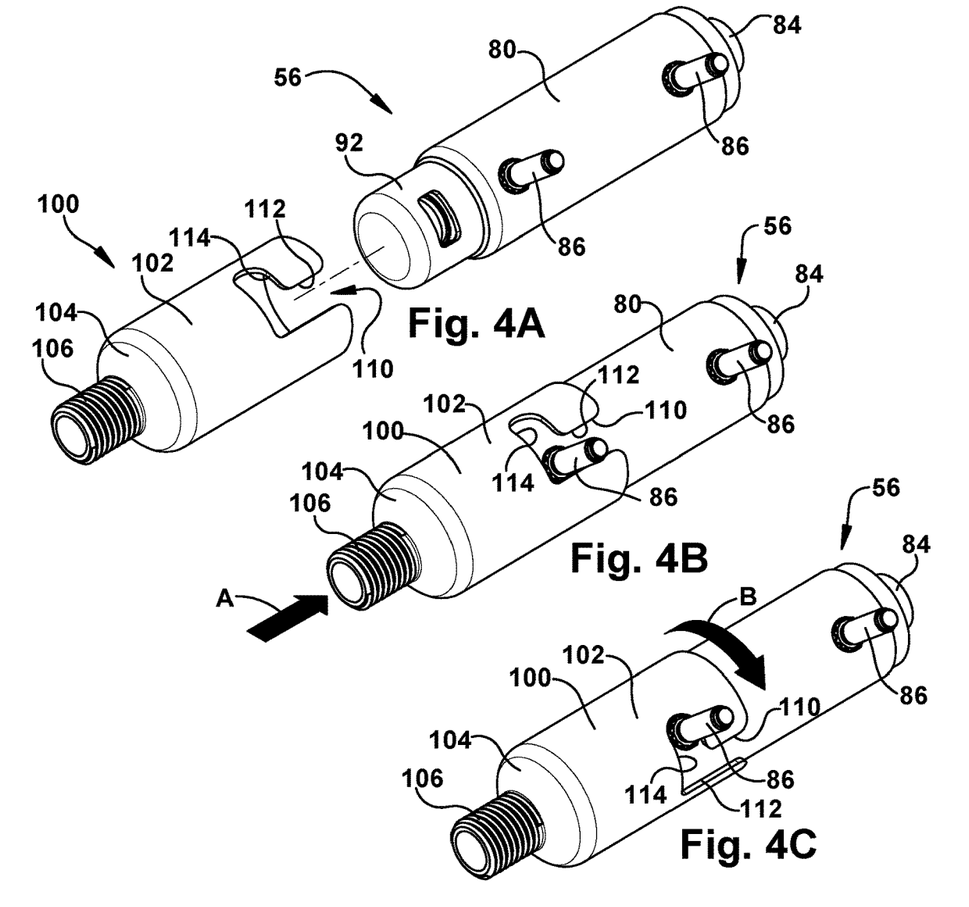
FIGS. 4A-4D illustrate the configuration and installation of a fill tube adaptor that forms a portion of the airbag module, according to one example configuration of the adaptor.

As the adaptor 100 is advanced over the inflator 56, it is maneuvered such that the stud 86 closest to the outlet 82 enters the first leg 112 of the slot 110. When the stud 86 reaches the second leg 114, the adaptor 100 is rotated, as indicated generally by arrow B in FIG. 4C, which causes the stud 86 to enter the second leg. The installation of the adaptor 100 is complete when the stud 86 engages the end of the second leg 114, as shown in FIG. 4C.

In one example configuration, the adaptor 100 can be fixed to the inflator 56 through installation of the threaded fastener, e.g., nut 88, (see, FIG. 2) used to connect the inflator to the vehicle 14 via the stud 86. In this configuration, the installed fastener 88 can impinge both the bracket 64 and the adaptor 100 against the inflator housing 80 to enforce the connection of these components. At the same time, the installed fastener 88 can also connect the inflator 56, and the airbag module 50, to the vehicle structure 42, 44 (see, again, FIG. 2).

In another example configuration, the adaptor 100 can be fixed to the inflator 56 through an interference fit. For example, the second leg 114 of the slot 110 can have a width that is slightly less than the diameter of the stud 86, creating an interference. In this instance, the twisting step of FIG. 4C would urge the stud 86 along second leg 114 of the slot 110, thus creating the interference fit, which would fix the adaptor 100 to the inflator 56.

As another example, an interference fit can be created between the engagement of the stud 86 with the rear edge of the second leg of the slot 110 and the engagement of the tapered/domed end 104 of the adaptor 100. Essentially, the adaptor 100 can be configured so that the end 104 engages the end of the inflator, e.g., the diffuser 92 or nozzle 82, while the stud 86 has not yet entered the second leg 114 of the slot 110 completely. As a result, an interference is formed. As the adaptor is twisted (FIG. 4C) the interference is overcome and the stud 86 enters the second leg 114. Through this interference, the adaptor 100 can be connected to the inflator 56.

Figure 4D:
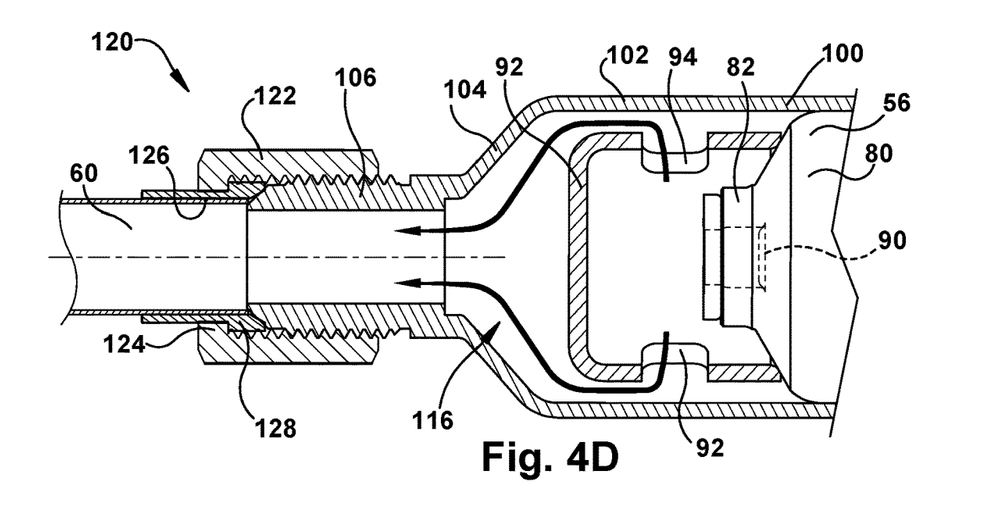

Referring to FIG. 4D, when the adaptor 100 is connected to the inflator 56, the sleeve 102 and tapered/domed end portion 104 shroud the inflator nozzle 82 and diffuser 92. The adaptor 100 creates a chamber 116 into which inflation fluid is discharged radially through the diffuser openings 94. The chamber 116 redirects the inflation fluid to flow through the nipple 106, into the fill tube 60, and therethrough to the airbag 52.

The adaptor 100 can be configured to connect with the fill tube 60 in a variety of manners. For example, in the example configuration of FIGS. 4A-4D, the nipple 106 is externally threaded and configured to secure the fill tube 60 via a compression fitting 120. The compression fitting 120 includes a compression nut 122 configured to thread onto the externally threaded nipple 106. The compression nut 122 has an end wall 124 with an opening 126 through which the fill tube 60 extends and enters the nipple 106. A compression sleeve/grommet 128 slides over the outside of the fill tube 60 and is positioned between the axial end of the nipple 104 and the end wall 124 of the compression nut 122. The compression sleeve/grommet 128 can be constructed of a material, such as brass or a polymer, that is deformable in response to being compressed when the compression nut 122 is tightened. Through this deformation, the compression fitting secured the fill tube to the adaptor 100.

Figure 5A:
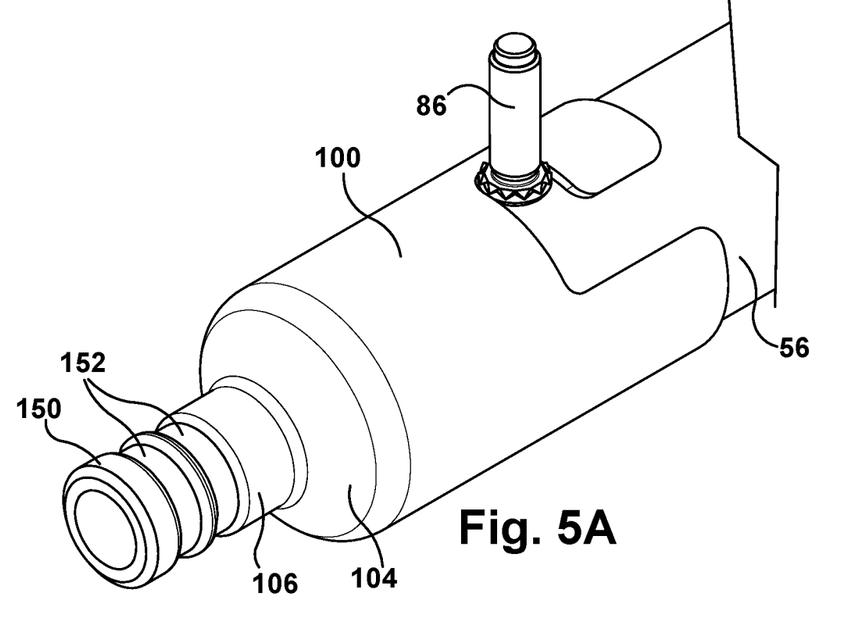
FIGS. 5A and 5B illustrates the configuration of a fill tube adaptor that forms a portion of the airbag module, according to another example configuration of the adaptor.
Figure 5B:
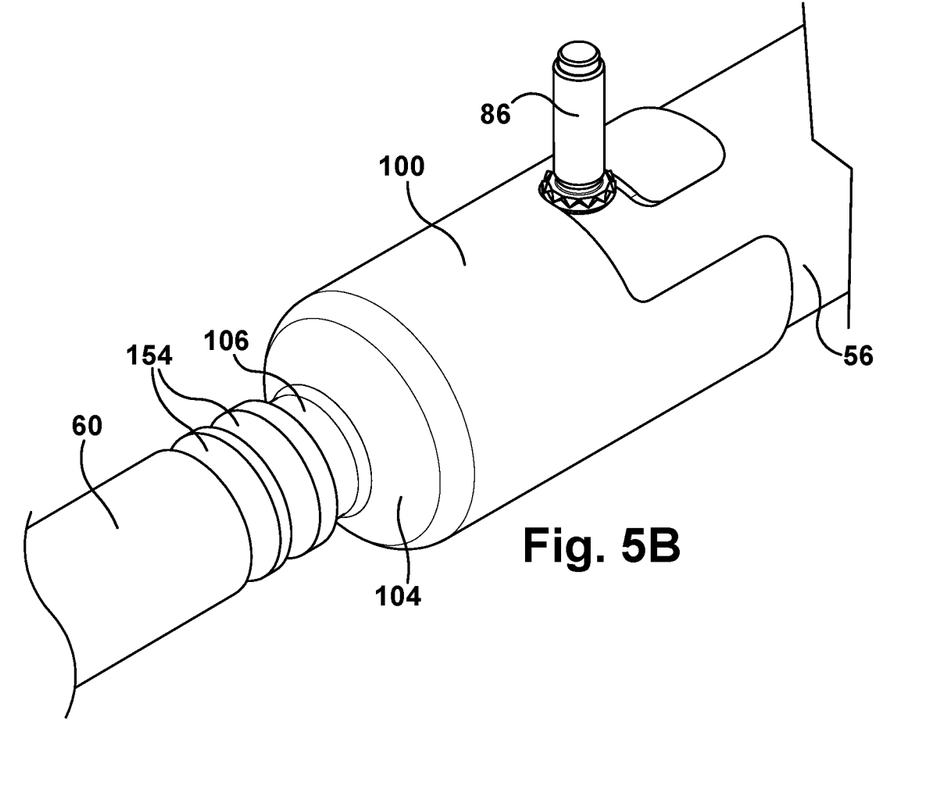

Another example configuration of the adaptor 100 is shown in FIGS. 5A and 5B. Referring to FIG. 5A, in this example configuration, the nipple 106 is configured to facilitate a crimped connection of the fill tube 60. To facilitate the crimped connection, the nipple 106 forms a crimp fitting 150 that includes one or more external recesses 152 that extend circumferentially around the nipple 106. Referring to FIG. 5B, to form the crimped connection, the fill tube 60 is positioned over the nipple 106 and a crimping tool is used to compress the tube into the recesses 152 of the crimp fitting 52. The crimping results in annular depressions 154 in the exterior of the fill tube 60 where the fill tube wall is crimped into the recesses 152.

Figure 6A:
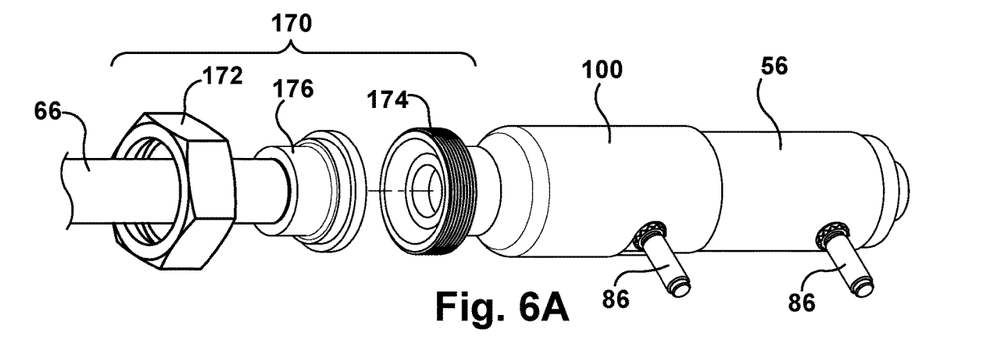
FIGS. 6A-6C illustrate the configuration and installation of a fill tube adaptor that forms a portion of the airbag module, according to another example configuration of the adaptor.
Figure 6B:
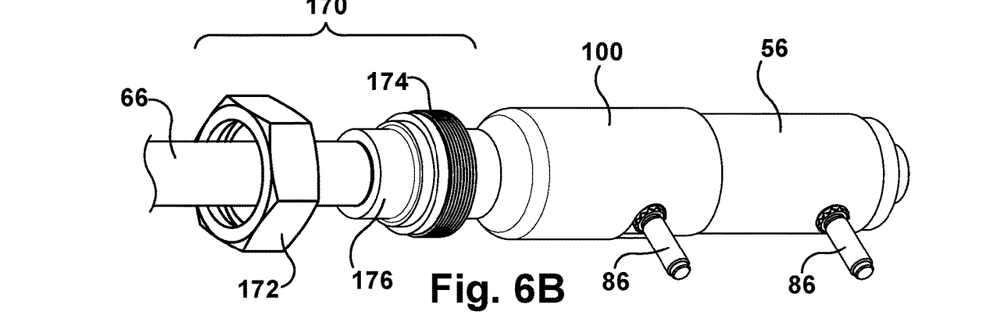
Figure 6C:
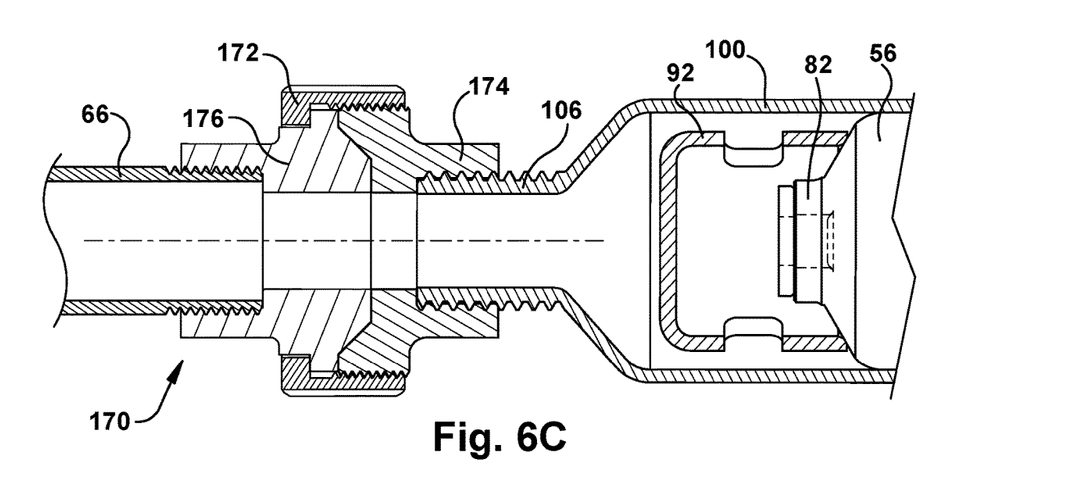

Another example configuration of the adaptor 100 is shown in FIGS. 6A-6C. In this example configuration, the nipple 106 is externally threaded and configured to secure the fill tube 60 via a union fitting 170. The union fitting 170 includes a nut 172, a female connector 174, and a male connector 176. The female connector 174 threads onto the nipple 106. The male connector 176 threads onto the end of the fill tube 60, with the nut 172 positioned over the fill tube prior to installation of the male connector.

The male connector 176 has an outwardly flared end 180 with a stepped configuration that is received at least partially in a recess 182 of the female connector 174. With the male connector 176 received in the female connector 174, the nut 172 is slid over the male connector and engages external threads 184 on the female connector. The nut 172 is screwed onto the female connector 174. As this occurs, the nut engages one of the stepped flares of the male connector 176. Further tightening of the nut 172 urges the male connector 176 into the female connector and enforces their engagement, thereby connecting the fill tube 60 to the adaptor 100. Although the female and male connectors 174, 176 of the union fitting 170 are illustrated as being connected to the adaptor 100 and fill tube 60, respectively, via threaded connections, it will be appreciated that one or both of those connections could be established by alternative means, such as a weld.

Figure 7:
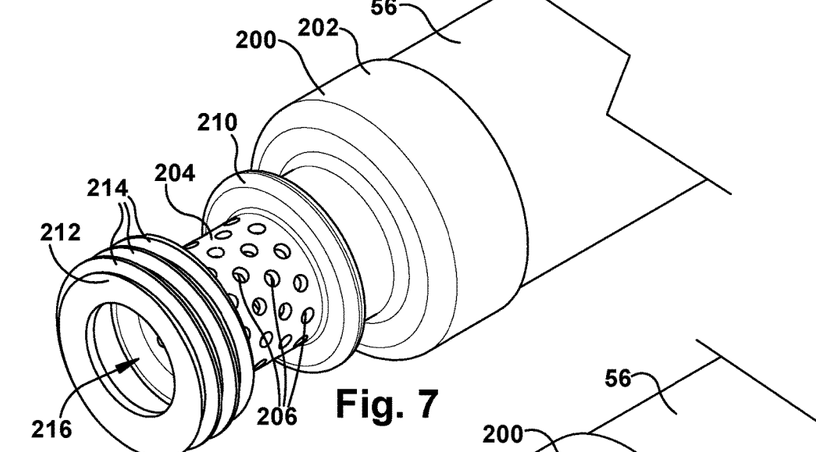
FIG. 7 illustrates the configuration of a fill tube adaptor that forms a portion of the airbag module, according to another example configuration of the adaptor.

Another example configuration of the adaptor is illustrated in FIG. 7. The adaptor 200 of FIG. 7 differs from the other configurations disclosed herein in that the adaptor replaces the diffuser 92 instead of being installed over it. The adaptor 200 includes a sleeve 202 that fits onto the end of the inflator 56 and covers the nozzle 82 (see, e.g., FIG. 4D). The adaptor 200 tapers from the sleeve 202, forming a cylindrical throat 204 that includes a plurality of thrust-neutral openings 206 configured to discharge inflation radially in opposing directions selected so that the assemblage of the inflator 56 and the adaptor are thrust neutral prior to installation. The throat 204 can also include an annular rim 210 configured to add stability to the structure. The adaptor 200 further includes a nipple 212 with external screw threads 214. Internally, an inflation fluid passage 216 extends the length of the adaptor 200, from the sleeve 202 to the nipple 212.

Figure 8A:
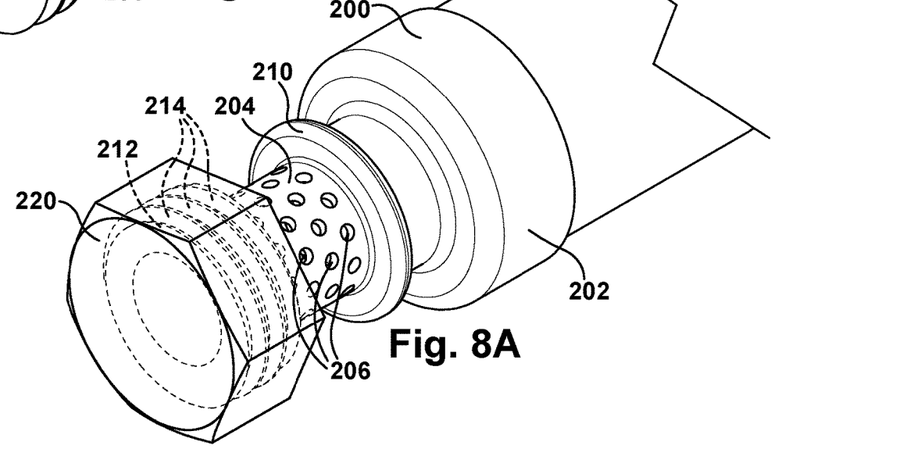
FIGS. 8A and 8B illustrate different conditions of the fill tube adaptor of FIG. 7.

Advantageously, the adaptor 200 is configured to offer both a thrust-neutral configuration for shipping and handling the inflator 56 prior to installation, and an operative configuration when installed in the vehicle. The thrust-neutral configuration is illustrated in FIG. 8A. In the thrust-neutral configuration, a closed end nut 220 is threaded onto the nipple 212, thus blocking the inflation fluid passage 216. In this thrust-neutral configuration, the nut 220 blocks axial inflation fluid flow through the passage 216, thus forcing fluid radially through the thrust-neutral openings 206, should the inflator be actuated accidentally prior to installation.

Figure 8B:
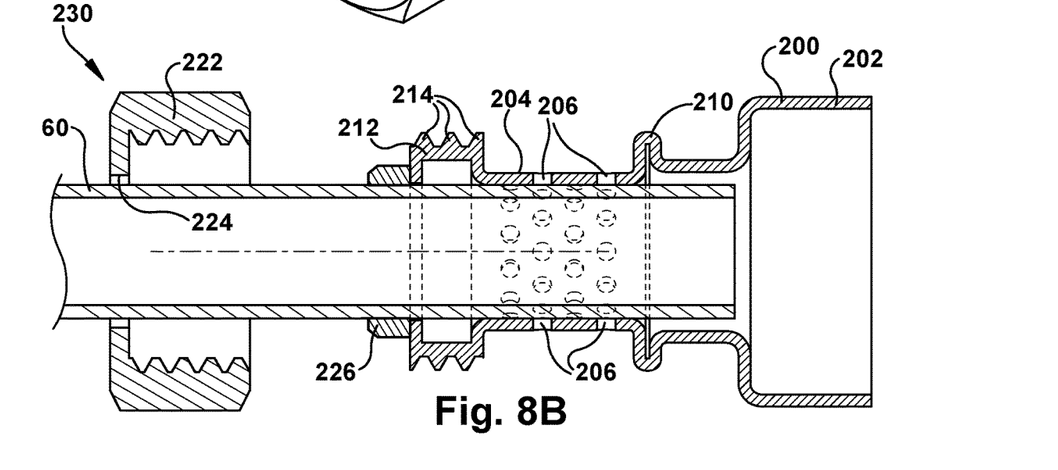

The operative condition of the adaptor 200 is illustrated in FIG. 8B. In the operative configuration, the closed end nut 220 is removed and the fill tube 60 is installed through an opening 224 in open end nut 222 and into the inflation fluid passage 216. The fill tube 60 extends axially beyond and covers the thrust-neutral openings 206. As a result, when the inflator 56 is installed and actuated, inflation fluid flows axially from the inflator into the fill tube 60. As another advantage, the adaptor 200 does not redirect inflation fluid flow from the inflator 56, which improves the volumetric flow rate of inflation fluid through the fill tube 60 by reducing backpressure.

The adaptor 200 can be configured to connect to the fill tube 60 in a variety of manners, including any of those described previously. In the example configuration of FIG. 8B, the connection is a compression fitting 230, similar or identical to that illustrated in FIGS. 4A-4C, in which the nut 222 receives a compression sealing element, such as a washer, sleeve, or grommet 226, which is compressed against the nipple 212 and fill tube 60 to connect the fill tube to the adaptor 200. Alternatively, the connection could be that of a crimped fitting, as shown in FIGS. 5A-5B, or a union fitting, as shown in FIGS. 6A-6C.

Figure 9A:
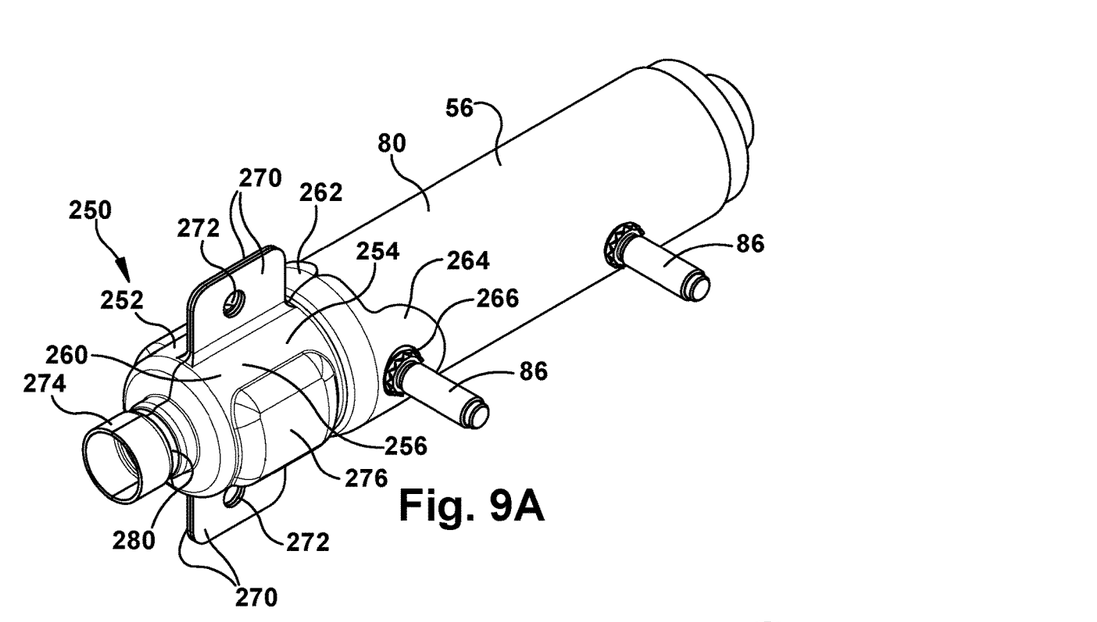
FIGS. 9A-9B illustrate the configuration and installation of a fill tube adaptor that forms a portion of the airbag module, according to another example configuration of the adaptor.
Figure 9B:
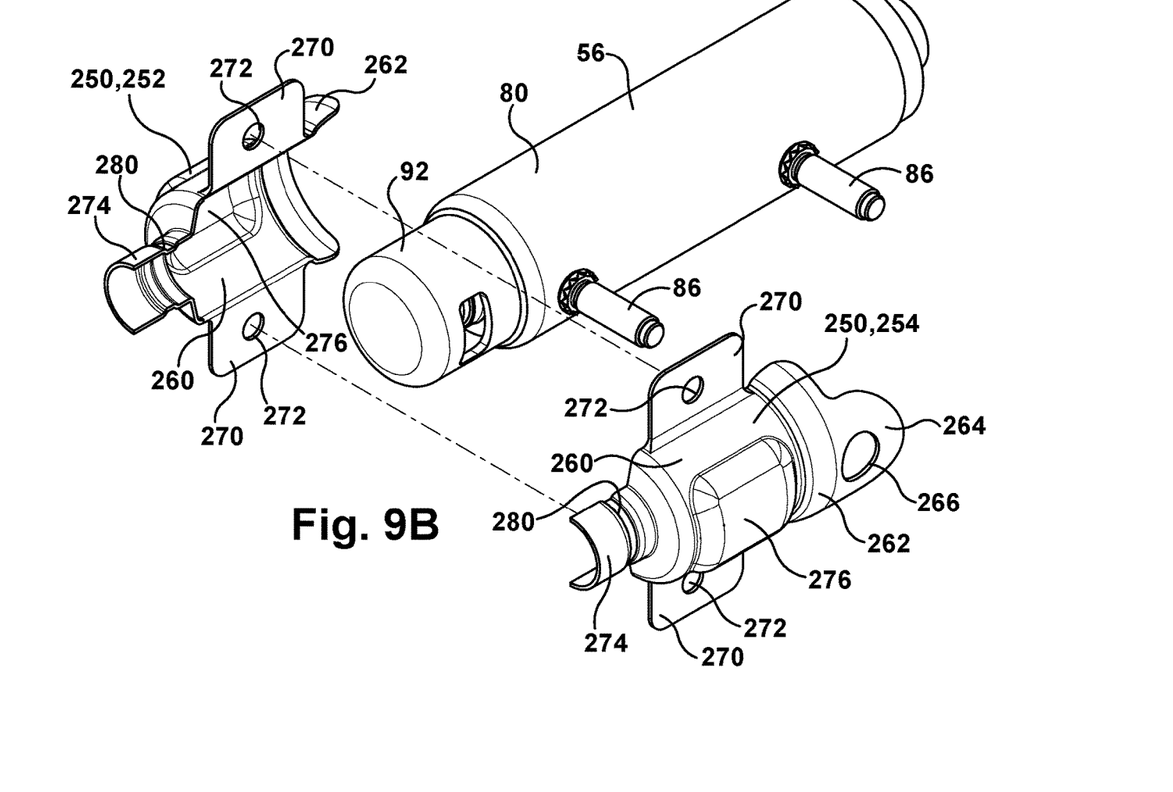

Another example configuration of the adaptor 250 is shown in FIGS. 9A and 9B. In this example configuration, the adaptor 250 has a two-piece configuration and includes first and second adaptor halves 252, 254. The adaptor halves 252, 254 mate with each other, forming a sleeve 256 of the adaptor 250. The adaptor halves 252, 254 are configured to be connected via flanges 270 which overlie each other, aligning their respective fastener openings 272. The overlying flanges 270 can be interconnected via fasteners extending through the openings 272.

To secure the adaptor 250 to the inflator 56, the adaptor halves 252, 254 are brought together around the diffuser 92 and the adjacent portions of the inflator housing 80. In doing so, the stud 86 adjacent the diffuser end of the inflator 56 passes through an aperture 266 of a stud receiving portion 264 of the second adaptor half 254. The adaptor halves 252, 254, when connected in this manner, are secured to the inflator 56.

The adaptor 250 also includes a nipple 274 composed of halves that are brought together when the adaptor halves 252, 254 are connected. The adaptor halves 252, 254 each include an outwardly extended portion 276 that aligns with the respective openings in the diffuser 92. These portions 276 increase the volume of the chamber formed by the adaptor 250 in the area where inflation fluid is discharged into the adaptor and is redirected toward the nipple 274.

The nipple 274 can be configured to facilitate a connection with the fill tube in any of the manners disclosed herein, e.g., compression fitting, union fitting, or crimped fitting. In the example configuration of FIGS. 9A-9B, the nipple 274 is configured for a crimped fitting, an includes at least one annular recess 280 for receiving the crimped fill tube.

From the above description of the invention, those skilled in the art will perceive applications, improvements, changes and modifications to the invention. Such applications, improvements, changes and modifications within the skill of the art are intended to be covered by the appended claims.

Having described the invention, we claim the following:

1. An adaptor for connecting a fill tube to an inflator, the adaptor comprising:
a sleeve configured to fit over a discharge end portion of the inflator and to be connected to the inflator; and
an end portion comprising a nipple configured to receive and connect with the fill tube, wherein the sleeve is configured to direct inflation fluid discharged from the inflator toward the nipple, and the nipple is configured to direct the inflation fluid into the fill tube, wherein the sleeve is configured to receive an inflator stud to connect the adaptor to the inflator.

2. The adaptor recited in claim 1, wherein the sleeve comprises a slot configured to receive the inflator stud to connect the adaptor to the inflator.

3. The adaptor recited in claim 2, wherein the slot has a generally L-shaped configuration, the adaptor being configured to slide axially over the discharge end of the inflator so that the inflator stud enters and slides along a first leg of the slot until it engages an edge of the slot, the adaptor being further configured to be twisted relative to the inflator so that the inflator stud enters and slides along a second leg of the slot.

4. The adaptor recited in claim 3, wherein the second leg of the slot is configured so that an interference is formed when the inflator stud enters the second leg of the slot, the interference retaining the adaptor on the inflator.

5. The adaptor recited in claim 4, wherein the interference is formed between opposite edges of the second leg of the slot and the inflator stud.

6. The adaptor recited in claim 4, wherein the interference is formed by the engagement between the inflator stud and one edge of the second leg of the slot, and by the engagement of the discharge end of the inflator and the end portion of the adaptor.

7. The adaptor recited in claim 1, wherein the nipple is configured to connect with the fill tube through one of a compression fitting, a union fitting, and a crimped fitting.

8. The adaptor recited in claim 1, wherein the adaptor comprises a throat that extends between the sleeve and the nipple, the throat comprising a plurality of thrust-neutral openings configured to discharge inflation radially in opposing directions;
wherein the nipple is configured to receive a closed end nut that blocks inflation fluid flow through the nipple so that inflation fluid discharged from the inflator is directed radially through the thrust-neutral openings; and
wherein the nipple is configured to receive an open end nut comprising an opening that permits the fill tube to pass through the nipple and through the throat thus blocking the thrust-neutral openings, the open end nut in combination with the nipple forming a fitting that connects the fill tube to the adaptor.

9. The adaptor recited in claim 1, wherein the adaptor comprises a pair of adaptor halves that are connectable with each other to form the sleeve.

10. The adaptor recited in claim 9, wherein each adaptor half includes one or more flanges configured overlie each other and to receive a fastener to connect the adaptor halves to each other and to secure the adaptor to the discharge end of the inflator.

11. The adaptor recited in claim 10, wherein one of the adaptor halves comprises an opening configured to receive the inflator stud.

12. The adaptor recited in claim 1, wherein the adaptor is configured to adapt an inflator configured to discharge inflation fluid radially into an airbag for axial inflation fluid discharge into the fill tube.

13. An airbag module comprising:
an airbag;
an inflator for producing inflation fluid for inflating the airbag;
a fill tube for delivering inflation fluid from the inflator to the airbag; and
the adaptor recited in claim 1.

14. The airbag module recited in claim 13, wherein the airbag module is configured to be installed in a vehicle roof, wherein the airbag is configured to deploy downward to an inflated and deployed position, wherein the inflator is configured to be installed remotely from the airbag, and wherein the fill tube is configured to extend from the inflator to the airbag.

15. The airbag module recited in claim 14, wherein the airbag comprises a frontal airbag configured to deploy between a vehicle occupant and an instrument panel of the vehicle, wherein the airbag is configured to be installed in a roof header and the inflator is configured to be installed in a roof rail.

16. The airbag module recited in claim 15, wherein the inflator is a passenger airbag inflator configured to be positioned inside a passenger airbag that deploys from the instrument panel, wherein the adaptor is configured to adapt the passenger airbag inflator for use with the fill tube.

17. A vehicle safety system comprising:
the airbag module recited in claim 13; and
a controller configured to actuate the inflator in response to the occurrence of an event for which inflation and deployment of the airbag is desired.

\* \* \* \* \*